United States Patent [19]
Tassone

[11] 3,760,574
[45] Sept. 25, 1973

[54] HARVESTER

[76] Inventor: Frank Tassone, Box 10, Gol Gol 2379, New South Wales, Australia

[22] Filed: Dec. 17, 1971

[21] Appl. No.: 209,086

[52] U.S. Cl. .................................. 56/330, 56/16.5
[51] Int. Cl. ............................................. A01g 19/04
[58] Field of Search ................. 56/330, 328 R, 331, 56/16.5

[56] References Cited
UNITED STATES PATENTS

| | | | |
|---|---|---|---|
| 3,184,908 | 5/1965 | Rust | 56/330 |
| 3,473,311 | 10/1969 | Fox | 56/330 |
| 3,360,913 | 1/1968 | Burton | 56/330 |

Primary Examiner—Louis G. Mancene
Assistant Examiner—J. N. Eskovitz
Attorney—Paul D. Flehr et al.

[57] ABSTRACT

Harvester for harvesting grapes growing on vines entwined with trellis wires by striking the vine with a vertically oscillating and freely rotatable head structure having projecting arms thereon the harvester having means for positioning the head vertically.

8 Claims, 11 Drawing Figures

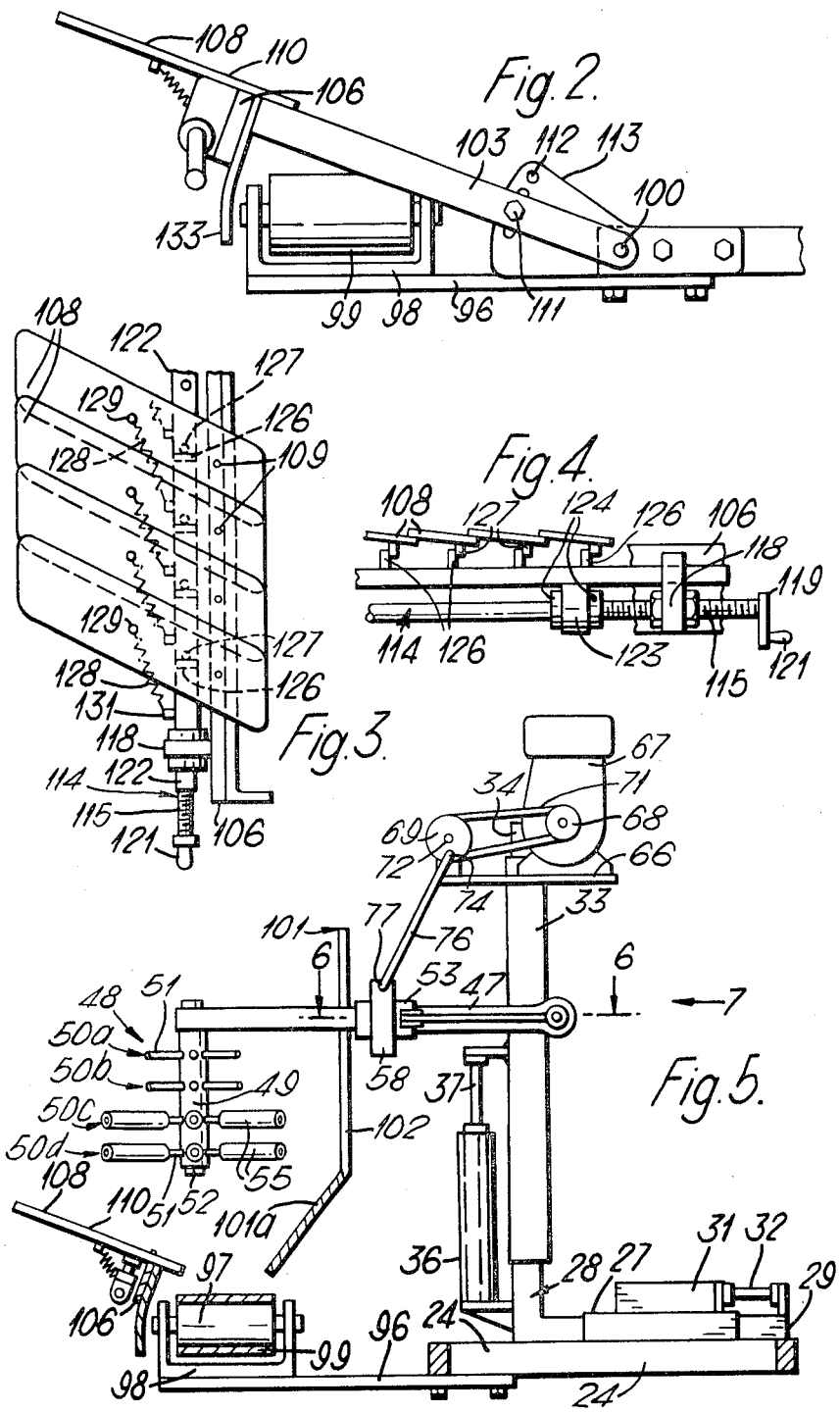

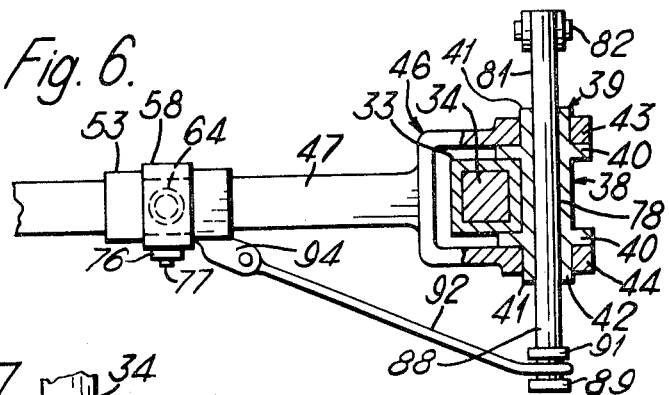
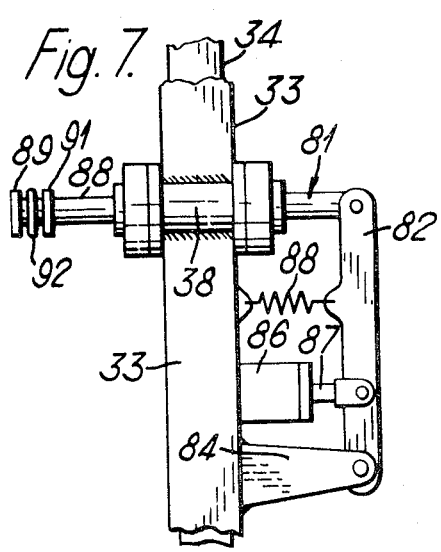
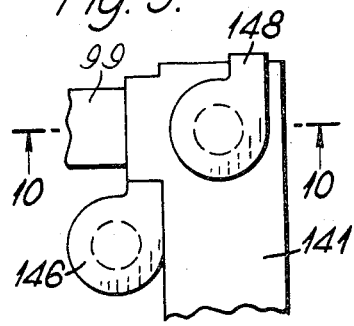
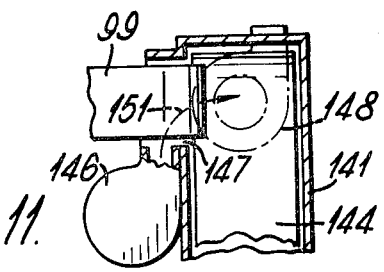

HARVESTER

BACKGROUND OF THE INVENTION

1. Field of the Invention

This invention relates to harvesting machines and particularly, but not exclusively, to harvesting machines suitable for harvesting grapes.

2. Description of the Prior Art

It is known to train grape vines so that the fruit bearing canes are entwined with generally horizontal wires. Usually the wires extend along rows of vines, one to either side. This arrangement of vines permits harvesting of grapes by the simple method of setting up vibrations in the wires so that the grapes are broken loose.

Harvesting is usually effected by means of a mobile harvesting machine which is driven along the length of the wires.

Certain machines of this kind utilise a head structure which is freely rotatable about a generally vertical axis and which is provided with radially extending arms. Means is provided for reciprocating the head structure in the direction of the axis of rotation so that, in use, the fruit bearing vine is repeatedly struck by the reciprocating arms to set up vibrations therein and to dislodge the fruit. Suitable means are provided for collecting the grapes as they are shaken loose.

Harvesters operating in the above manner are obviously attractive from the economical point of view but they tend to be rather inefficient, often leaving large amounts of fruit on the vines. Furthermore, the prior machines require additional apparatus for aligning the wire so that it is always positioned properly to enable it to be struck by the arms. For example, one machine of this kind, that which is described in the specification of U.S. Pat. No. 3,490,217, to H. P. Olmo et al., utilises pairs of spiked freely rotatable inter-leaving wheels at forward and rearward locations for supporting the wire and maintaining it in a properly oriented manner for operation thereon by the head structure. Although the pairs of wheels adequately serve their purpose, there is thereby introduced an extra element of complexity into the machine.

One object of the present invention is to provide a harvesting machine which is relatively simple in construction and which avoids the need for providing specific wire support and positioning means for the head structure.

BRIEF SUMMARY OF THE INVENTION

According to the invention there is provided a harvester comprising a mobile mounting frame, a head structure means mounting said head structure on said frame for up and down reciprocation and for free rotation about an upright axis, and drive means for imparting said reciprocation to said head structure, said head structure having outwardly extending arms arranged in at least two layers spaced apart in the direction of said axis, there being a plurality of arms in each layer disposed at angular intervals about said axis; the harvester further including positioning means for controllably varying the height of the mean position of said head structure relative to the frame during reciprocation of said head structure. The wire is then maintained positioned between the layers by virtue of movement due to striking by the arms thereby maintaining the wire position between the two layers of arms. No specific alignment mechanism is therefore required on the harvester. This brings about the simplification of the construction of the harvester.

A further reason for the inefficiency of prior harvesting machines is that they are not usually capable of extracting fruit from all of the canes of vines. In this regard, it is generally not possible to ensure that all of the fruit borne by the vines is located on canes which are accessible to the head structure. Particularly, it is normally impossible to manoeuvre the harvester such that the arms project far into the vines because the arms would thus strike the wire supports as the machine passes them. Such fruit is therefore inaccessible. In accordance with another aspect of this invention, this difficulty is overcome by providing at least the lowermost layer of arms of the head structure, with flexible extensions. In this case, the harvester can be manoeuvred during harvesting so that the extensions project inwardly at least to the centre of the vine whilst any contact between the extensions and wire support does not give rise to damage to the machine. The extensions are preferably provided on two lowermost layers of arms, but in some situations it may be convenient to utilise a head with four layers of arms, the lower three having extensions.

BRIEF DESCRIPTION OF THE SEVERAL VIEWS OF THE DRAWINGS

In order that the invention may be better understood, reference is now made to the accompanying drawings, in which:

FIG. 2 is a fragmentary front elevation of part of the apparatus shown in FIG. 1;

FIG. 3 is a fragmentary plan view of portion of the apparatus shown in FIG. 1 but on a larger scale;

FIG. 4 is a fragmentary side elevational view corresponding to the portion of the apparatus shown in FIG. 3;

FIG. 5 is a cross-sectional view of the apparatus shown in FIG. 1 and taken on the line 5—5 thereon;

FIG. 6 is a cross-section on the line 6—6 in FIG. 5;

FIG. 7 is a fragmentary view looking in the direction indicated by arrow 7 in FIG. 5;

FIG. 8 is a fragmentary perspective view showing the manner of interconnection of portion of the mechanism shown in FIGS. 5 and 6;

FIG. 9 is a fragmentary plan view showing an attachment designed for use with the apparatus of FIG. 1;

FIG. 10 is a cross-section on the line 10—10 in FIG. 9, and

FIG. 11 is a cross section on the line 11—11 in FIG. 10.

DETAILED DESCRIPTION

Figure 1:
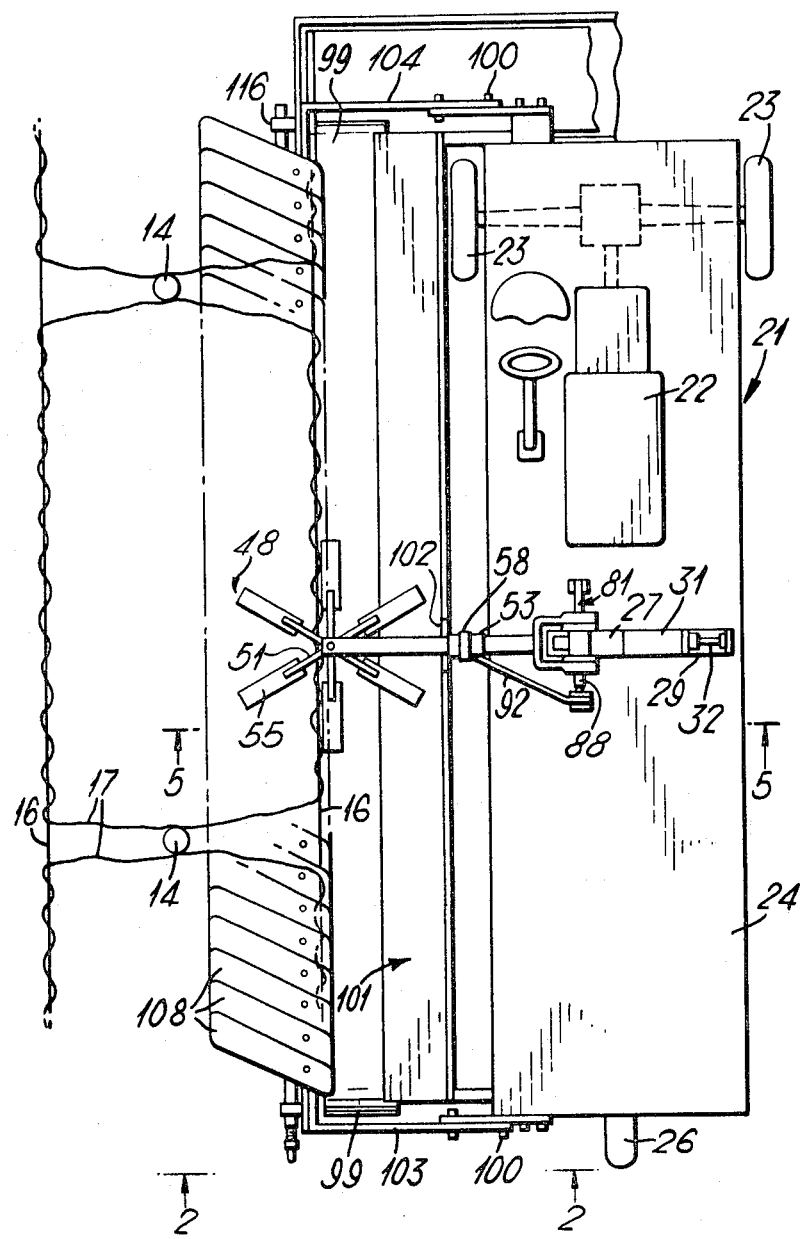
FIG. 1 is a plan view of a mobile harvester apparatus constructed in accordance with the invention, the drive means for the head being omitted for clarity.

FIG. 1 shows grape vines 14 arranged in a row. A pair of trellis wires 16 extend generally in parallel relation one to either side of the row of vines. The wires are supported on supports (not shown). These may conveniently comprise T shaped members with the wires supported at the free ends of the arms. The arms of the supports may be rigidly attached to the upright parts thereof, the wires in this case merely resting on the arms. Preferably, however, the arms of each support are pivotally secured at their inner ends to the upright part thereof in such a manner that they can pivot between generally horizontal portions and upwardly inclined portions. The wires are in this case secured to the outer ends of the arms and the arms thus normally assume, under the influence of the weight of the wires and vines, generally horizontal dispositions. Of course other forms of support may be utilised but they should be such as to permit the trellis wires to be lifted from their normal dispositions to positions in which they can be moved up and down to some extent without substantial obstruction.

The canes 17 of the vines, which bear the grapes, are entwined with wires 16. The harvester 21 is designed to traverse the length of wires 16 to remove grapes from canes 17. Harvester 21 includes a generally rectangular frame 24 upon which are mounted a rear pair of ground wheels 23, and a forward ground wheel 26. Wheels 23 are drivable by a motor 22 carried by frame 24. Forward guidewheel 26 is steerable.

As best seen from FIG. 5, frame 24 is provided, at a point intermediate its length, with a transversely extending guide 27. An L-shaped sub-frame 28, which comprises a first support member, is mounted on frame 24 with one arm 29 extending through guide 27. An extensible hydraulic ram 31 is secured to guide 27 and is thus fixed relative to frame 24. Arm 29 is slidable in guide 27 and the free end thereof is connected to the plunger 32 of ram 31. Thus, extension and distension of ram 31 serves to move sub-frame 28 transversely of the machine.

An elongate collar 33, which comprises a second support member, is slidably mounted on the upstanding arm 34 of sub-frame 28. A hydraulic ram 36 is secured at one end of the arm 34 and the plunger 37 of this ram is secured to collar 33 so that extension of ram 36 serves to move collar 33 vertically upon arm 34. Ram 36 is interconnected with a hydraulic circuit coupled to control means (not shown) which allows an operator to continuously regulate the vertical position of sleeve 33 on arm 44 during use of the harvester.

Collar 33 carries, intermediate its end, a pivot member 38 which is of generally cylindrical form with a pair of spaced peripheral flanges 40. Member 38 is affixed to collar 33 by welding.

A cylindrical part 39 of member 38 extends transversely of collar 33 and is displaced to one lateral side thereof.

The ends of part 39 define a pair of spaced pivot pins 41, 42. The arms 43, 44 of a yoke 46 are engaged upon the pivot pins 41, 42, the pivot pins extending through holes in the arms so that the yoke is pivotal in a vertical plane and about the axis of part 39.

A support arm 47 is rigidly affixed to yoke 46 and extends therefrom in cantilever fashion. The free end of arm 47 carries a shaking head 48, which comprises a generally cylindrical drum portion 49 provided with a plurality of radially extending arms 51. Arms 51 are arranged in four separate spaced layers 50a, 50b, 50c, 50d spaced along the length of drum portion 49, there being six equi-spaced arms in each layer.

The arms of the lowermost pair of layers rows 50c, 50d are provided, at outer ends thereof, with flexible extensions 55. These may be of rubber hose and extend outwardly from the ends of the arms to which they are fitted a distance approximately equal to the length of the arms.

Head structure 48 is supported on an axle 52 on arm 47 for free rotation about its axis. Axle 52 extends downwardly from the free end of arm 47.

Arm 47 is provided with a cylindrical sleeve 53, of cross-section complementary to that of arm 47. This is slidable lengthwise of the arm. An open framework coupling member 58 is slidably mounted upon sleeve 53. Coupling member 58 comprises a pair of vertical opposite side walls 59, 61 which are engaged within vertical slots 54 in the side faces of sleeve 53, and a pair of end walls 62, 63 which extend between walls 59, 61, at the opposite ends thereof. A pair of coil springs 64, 65 are mounted between the respective end walls 62, 63 and the adjacent upper and lower faces of sleeve 53. Springs 64, 65 bias coupling member 58 an intermediate position lengthwise within slots 54 but member 58 is movable vertically relative to sleeve 53 in the direction of slots 54 in either direction away from the intermediate position and against the bias of one or other of the springs 64, 65.

Collar 33 is provided with a horizontal platform carries mounted towards the upper end thereof. This platform carriers a motor 67 which drives a pulley 68. Pulley 68 is interconnected with another pulley 69 by means of an endless belt 71. Pulley 69 is mounted for free rotation upon a shaft 72 displaced with its axis parallel to the axis of pulley 68 so that rotation of motor 67 causes pulley 69 to be driven. Pulley 69 has an eccentric pin 74 and coupling member 58 is provided at its upper end with a similar pin 77.

A connecting rod 76 is pivotably secured at respective ends to pins 74, 77 so that, when pulley 69 rotates, and the member 58 is constrained against movement lengthwise on arm 47, arm 47 is caused to effect back and forth oscillation about the axis of pins 41, 42 thereby causing head 48 to undergo up and down reciprocatory movement along a generally vertical path of movement.

As best shown in FIGS. 6 and 7, pivot member 38 is provided with a bore 78 which extends therethrough generally co-axial with cylindrical part 39. A shaft 81 extends within this bore and is slidable therethrough One end of shaft 81 is pivotably connected to a lever 82, and the other end of the lever is pivotably connected to a fixed projection 84 on collar 33.

A hydraulic ram 86 is connected to collar 33 and the plunger 87 thereof is pivotally connected to lever 82 at a point intermediate the points of the connections to projection 84 and shaft 81.

A helical tension spring 88 is connected, at one end, to lever 82 at a point intermediate the connections to plunger 87 and to shaft 81 and, at the other end thereof, to collar 33. Thus, spring 88 acts upon lever arm 82 in a manner tending to cause movement of shaft 81 through pivot member 38 in a direction towards the forward end of the machine 21 that is to say from right to left in FIG. 7.

The end 88 of shaft 81 which is opposite to that to which lever arm 82 is connected is provided with a pair of spaced radial flanges 89, 91. A link 92 is connected at one end to shaft 81, at a position between flanges 89, 91. Lever arm 82 is pivotable about the axis of shaft 81 whilst it is constrained against lengthwise movement relative to the shaft by the flanges. The spacing of the flanges is such as to permit considerable pivotal movement of lever arm 82 about axes transverse to shaft 81. The other end of link 92 is connected to a pin extending between two projecting plates 93, 94 on sleeve 53.

It will be seen that, as shaft 81 is moved from left to right in FIG. 7, by extension of ram 86, the positioning of sleeve 53 on arm 47 will be altered to shift the sleeve further from the centre of pivotal movement of the arm.

A second sub-frame 96 is secured to main frame 24 so as to extend longitudinally thereof and to that side thereof to which arm 47 extends. This second sub-frame carries a plurality of longitudinally spaced rollers 97 mounted for free rotation about transverse axes and on support brackets 98. These support an endless conveyor belt 99 which extends lengthwise of sub-frame 96. The conveyor is driven by suitable means (not shown) so that the upper run thereof traverses the length of the machine from front to rear. Conveyor 99 is disposed so as to run directly under head 48.

A deflecting plate 101 extends lengthwise of the machine and generally vertically, being displaced on the inboard side of conveyor 99 and having its lower part 101(a) outwardly splayed so that the lower marginal edge thereof extends lengthwise above the upper surface of conveyor 99. The deflecting plate is provided with a vertical slot 102 to allow for vertical movement of arm 47, the arm projecting through the plate.

A pair of supporting arms 103, 104 are pivotably connected to main frame 24 respectively at the front and rear ends thereof and by means of pivot pins 100. These arms extend transversely of the machine and carry at their outer ends a lengthwise extending rail 106. Rail 106 extends between the arms 103, 104 and carries a plurality of metal plates 108. Plates 108 are of elongate generally parallelogram shaped configuration and are secured to rail 106 by means of upwardly extending pivot pins 109. Plates 108 are angularly disposed so as to extend outwardly and rearwardly of the machine and, together, define a substantially continuous upper surface 110. The inclination of surface 110 is variable by swinging of arms 103, 104 about their pivot pins 100.

Arms 103, 104 are lockable at any one of a plurality of angular dispositions by means of bolts 111 which extend therethrough and which are insertable through apertures 112 in plates 113 secured to sub-frame 96 at the respective ends thereof. The surface 110 defined by plates 108 is arranged so that the lower most edge thereof is spaced a variable, and relatively small distance above conveyor 99. Surface 110 and outwardly splayed portion 101(a) of deflecting plate 101 together define a convergent pathway for directing fruit, displaced by head 48, onto conveyor 99.

A shaft 114 extends lengthwise of the machine and to the outer side of rail 106. Shaft 114 is mounted for free rotation at its rear end in a bracket 116 extending from rail 106. Its forward end 115 is threaded and is threadably received in a bracket 118 also secured to rail 106. The extreme forward end of member 114 is provided with a radially extending arm 119 and a forwardly projecting handle 121 to enable rotation of shaft 114 by hand.

A guard plate 133 extends lengthwise of sub-frame 96, and is carried by rail 106. It extends below rail 106 and adjacent conveyor 99.

A beam 122 is mounted above member 114, being mounted for free reciprocatory movement relative to both sub-frame 96 and rail 106. A projection 123 is rigidly affixed to beam 122 and is provided with an aperture through which member 114 extends for free rotation. Shaft 114 is provided with a pair of spaced collars 124 located one to either side of projection 123.

Beam 122 is provided with a plurality of upstanding abutments 126 one of which is associated with each plate 108. Each plate 108 has a downwardly extending projection 127 which is displaced rearwardly of the associated abutment 126. A number of helical tension springs 128 are provided, one end of each spring being affixed to a separate plate 108 at a point 129 spaced to the opposite side of abutment 127 to the pin 109. The other ends of the springs are secured to spaced points 131 on beam 122.

The springs 128 tend to rotate the plates 108 in an anti-clockwise direction as viewed in FIG. 3 about pins 109. The extent of rotation is limited by engagement of the abutments 126 with pins 127. The lengthwise extent of movement can be varied by turning shaft 114 to move beam 122 lengthwise of the machine so that the relevant angular displacement of the plates 108, and the extent to which they project laterally outwardly of the machine, may be varied.

In use, the harvester is driven along the length of the trellis wire 16 and to one side of the row of vines. The harvester is manoeuvred such that the trellis wire is disposed between two layers 50(a), 50(b) or 50(b), 50(c) or 50(c), 50(d) or arms 51 on head 48, as is shown in FIG. 5. The head is manoeuvred to assist in this positioning, by actuation of rams 31 and 36, to move sub-frame 28 on collar 33 to effect, respectively, lateral and vertical adjustment of the position of head 48. Motor 67 is actuated to cause vertical reciprocation of head 48 and the head is shifted vertically by actuation of ram 36, to lift the trellis wire between the arms disposed to either side thereof and the wire 16 is then lifted and struck alternately at upper and lower sides and repeatedly, by arms 51 in the respective adjacent layers 50(a), 50(b) or 50(b), 50(c) or 50(c), 50(d).

The extent of vertical reciprocation of head 48 is adjusted by actuation of ram 86 to set the position of sleeve 53; movement of sleeve 57 towards the axis of member 38 will cause the length of stroke of head 48 to be increased. The length of the stroke is adjusted so that striking of the wire 16 is sufficient to cause dislodgement of the grapes on vines 14 without causing undue damage to the vines or fruit. Fruit dislodged by head 48 falls and is deflected by plates 108, and 101 onto conveyor 99 for transportation to the rear of the machine where they may be collected in any suitable container or otherwise.

As the harvester moves, the vertical disposition of head 48 can be continuously adjusted by the operator to maintain it such that the wire is properly lifted and struck by the head. It is to be noted, particularly, that by this expedient there is no need to provide, on the present apparatus, a specific mechanism for locating the wire relative to the head. Furthermore, the operation is such that the trellis wire is not dislodged during harvesting.

The flexible extensions 55 to arms 51 operate to directly engage fruit which is positioned so far inwardly of the wire being treated that the vibration of the wire, alone, would not cause dislodgement. The direct engagement causes dislodgement of such fruit.

By altering the position of arms 103, 104 which carry plates 108, the inclined surface 110 defined by plates 108 may be moved underneath the vines and as close to the wires 16 as is practicable so that damage caused by excessive lengths of falls of the grapes is minimised. By adjusting the pivotable position of plates 108 by their pivotable pins 109, the direction of lateral extent of surface 110 may be varied to ensure that the surface extends as far as is practicable underneath the canes 17 and wires 16.

Plate 133 prevents interference with conveyor 99 by canes of vines 14.

As the machine progresses along the length of the wire 16, head 48 rotates about its vertical axis so that sequentially, all of the arms 51 in each layer come into operation during use. By this expedient, damage to the vines is minimised. It will be understood that if head 48 did not rotate, there would be a tearing effect upon the vines as the machine moves along the wire. The provision of three spaced layers of arms 51 on the head helps to ensure that wire 16 will always be kept between a pair of layers 50(a), 50(b) or 50(b), 50(c) or 50(c), 50(d), so that shaking of the wire will not be interrupted by slipping of the wire from beneath one pair of layers, as might, for example, occur because of surface irregularities on the path of the harvester.

During shaking, it may occur that head 48 will momentarily be held against vertical reciprocation by entanglement with canes 17 and the resilient coupling of connecting rod 76 to sleeve 53, provided by coupling member 58 and springs 64, 65, assists in preventing damage under these circumstances by allowing continued reciprocation of rod 76 even when head 48 is held. Springs 64, 65 are such as to exert a force sufficient to transfer movement to head 48 except when a substantial resistance to its movement is encountered.

FIGS. 9 to 11 illustrate an attachment which may be secured to the rear end of the harvester 21. The mechanism includes a housing 141 whikh is attached to the machine such that the rear end of conveyor 99 extends thereinto via a forwardly arranged opening 142. Thus, material on conveyor 99 is delivered into a chamber 143 defined by the interior of housing 141.

A transversely extending conveyor 144 is mounted within housing 141 and below and to the rear of the end of conveyor 99. The conveyor 144 is positioned so that material leaving conveyor 99 falls thereonto and is transported laterally across the machine to a suitable collecting bin or the like.

A fan 146 is mounted externally on housing 141 and is arranged so as, in use, to provide a stream of air directed rearwardly of the machine and immediately below and at the end of conveyor 99. This stream emerges from an opening 147 into housing 141 just above conveyor 144.

A second fan 148 is also arranged externally of housing 141 and is attached thereto immediately on the rear of belt 99 and above conveyor 144. This fan is arranged to exhaust air from chamber 143 via an opening 149 arranged in the top of housing 141. Thus, when fans 146, 148 are operating, there will be an air flow through chamber 141 from opening 147 to opening 149.

This air flow is indicated by the dotted arrow 151 in FIGS. 10 and 11 and 16 crosses the path, indicated by arrow 152 in FIG. 10, of material leaving the conveyor 99 and falling into conveyor 144. Thus, when the machine is used, the grapes and other dislodged material, such as leaves and twigs, dislodged from vines 14, are transported along conveyor 99 and discharged from the end thereof. However, since the material dislodged apart from the grapes, will generally be lighter than the grapes, it is possible, by suitable adjustment of the air flow through the chamber 143, to separate the unwanted material from the grapes so that it is ejected at the outlet of fan 148, the grapes themselves being discharged onto conveyor 144.

The claims defining the invention are as follows:

1. A harvester for harvesting grapes on vines extending along a generally horizontal trellis wire, comprising; a mobile frame, an arm means pivotally mounted on said frame for up and down oscillation, a head structure, means mounting said head structure on said arm means for up and down oscillation therewith and for free rotation about an upright axis thereon, drive means for imparting said oscillation to said arm means, said head structure having outwardly extending arms arranged in a plurality of layers spaced apart in the direction of said axis, there being a plurality of arms in each layer disposed at angular intervals about said axis; the harvester further including positioning means for controllably varying the height of the pivotal mounting of said arm means relative to the frame during oscillation of said head structure whereby, in use of the harvester, the harvester is moved lengthwise along said wire and manoeuvred to position said wire between a pair of said layers and, with said drive means operating, said positioning means is operable to position said wire between said arms of said first pair of layers in which position it is struck alternately from opposite sides by those arms.

2. A harvester as claimed in claim 1 wherein the arms of said layers are substantially rigid, the arms of the lower layers having resiliently flexible extensions thereon.

3. A harvester as claimed in claim 1, wherein said mounting means includes an upwardly extending first support member mounted on said frame and a second support member movable lengthwise along said first support member, said head structure being secured to said second support member for lateral reciprocation relative thereto and said positioning means including an extensible link between said first and second support members.

4. A harvester as claimed in claim 3, wherein the means for oscillating said arm means comprises a motor drive crank connected to the arm means via a connecting rod, said connecting rod being pivotally connected to said arm means and slidable therealong, the harvester including means for variably positioning said sleeve along the length of the arm means to vary the stroke of reciprocatory movement of the head structure.

5. A harvester as claimed in claim 3 wherein said first support member is movable laterally of the harvester and means is provided for selectively effecting such movement.

6. A harvester as claimed in claim 4 wherein said means for variably positioning the sleeve comprises: a shaft carried by said mounting frame said shaft being coaxial with the axis of pivotal movement of said support arm on said second support member and being axially movable; an actuating link pivotally secured at one end to said shaft and pivotally secured at the other end to the sleeve; and means for shifting said shaft axially so that said sleeve is drawn along the length of said support arm.

7. A harvester as claimed in claim 6 wherein said means for shifting said shaft comprises a lever pivotally secured at one end to said second support member and at the other end to said shaft; extensible means connected at one end to said second support member and at the other end to said lever at a point intermediate the pivotal connections to said second support member and shaft, and tension spring means secured at one end to said lever at a point to the same side of the pivotal connection between said extensible means and said lever as the pivotal connection between said lever and said shaft and at the other end to said second support member.

8. A harvester as claimed in claim 6 wherein said connecting rod is connected to said sleeve via a resilient connection.

* * * * *